US012736372B2

(12) United States Patent
Yamada

(10) Patent No.: US 12,736,372 B2
(45) Date of Patent: Sep. 15, 2026

(54) MEASUREMENT DEVICE AND MEASUREMENT METHOD AND MEASUREMENT PROGRAM THEREFOR

(71) Applicant: Alps Alpine Co., Ltd., Tokyo (JP)

(72) Inventor: Tomoki Yamada, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 434 days.

(21) Appl. No.: 18/154,548

(22) Filed: Jan. 13, 2023

(65) Prior Publication Data

US 2023/0194310 A1 Jun. 22, 2023

Related U.S. Application Data

(63) Continuation of application No. PCT/JP2021/024694, filed on Jun. 30, 2021.

(30) Foreign Application Priority Data

Aug. 5, 2020 (JP) ................................ 2020-132842

(51) Int. Cl.
*G01D 3/032* (2006.01)
*G06F 3/041* (2006.01)

(52) U.S. Cl.
CPC ............. *G01D 3/032* (2013.01); *G06F 3/041* (2013.01)

(58) Field of Classification Search
CPC .... G06F 3/041662; G06F 3/044; G06F 3/041; G06F 3/0418; G06F 3/04182; G01D 3/032; H03K 17/962; H03K 2217/96074
See application file for complete search history.

(56) References Cited

U.S. PATENT DOCUMENTS 8,976,145 B2 3/2015 Taylor et al.
9,817,537 B1 * 11/2017 Shakya ............... G06F 3/04166
2012/0249476 A1 * 10/2012 Schwartz ............. G06F 3/0418 345/174

(Continued)

FOREIGN PATENT DOCUMENTS

WO 2018/211760 11/2018

OTHER PUBLICATIONS

Park et al., Analysis of Multi-Level Simultaneous Driving Technique for Capacitive Touch Sensors (Year: 2017).*

(Continued)

*Primary Examiner* — Mohammad K Islam
(74) *Attorney, Agent, or Firm* — Beyer Law Group LLP

(57) ABSTRACT

A measurement device includes N (N≥2) sensors, a selection unit configured to select a predetermined combination of sensors in each measurement and output a detection value to each of M (M<N) sensor terminals based on measurement values provided by the selected sensors, a detection unit configured to acquire the detection value output to each of the M sensors in each measurement, and a correction unit configured to, after the measurement is performed L times, based on an assumption that each of M×L detection values acquired by the acquisition unit includes a time-dependent noise component, correct each of the M×L detection values such that the time-dependent noise component of each of the detection values is replaced by a common noise component obtained by averaging the L time-dependent noise components along a time axis.

16 Claims, 6 Drawing Sheets

(56) References Cited

U.S. PATENT DOCUMENTS

| | | | | |
|---|---|---|---|---|
| 2014/0015793 | A1* | 1/2014 | Chen | G06F 3/04182 345/174 |
| 2015/0054754 | A1* | 2/2015 | Han | G06F 3/0446 345/173 |
| 2015/0212623 | A1* | 7/2015 | Hatano | G06F 3/04186 345/174 |
| 2016/0117051 | A1* | 4/2016 | Han | G06F 3/04166 345/173 |
| 2017/0131829 | A1* | 5/2017 | Takahashi | G06F 3/04182 |
| 2017/0147141 | A1* | 5/2017 | Khazeni | G06F 3/041662 |
| 2018/0074613 | A1* | 3/2018 | Lee | H03K 17/962 |
| 2019/0102017 | A1* | 4/2019 | Kim | G06F 3/0412 |
| 2021/0103360 | A1* | 4/2021 | Manca | G06F 3/04166 |
| 2021/0173523 | A1* | 6/2021 | Lee | G06F 3/05 |
| 2022/0011891 | A1* | 1/2022 | Yu | G06F 3/04164 |
| 2022/0229497 | A1* | 7/2022 | Kato | G06F 3/0334 |

OTHER PUBLICATIONS

Lee et al. , Fully Differential Touch Screen Controller with Wide Input Dynamic Range for Thin Displays (Year: 2020).*

* cited by examiner

1
CIRCUIT UNIT
3
CONTROL UNIT
6
{Vp1 (t1), Vp2 (t1)} = {VS0, VS2}
{Vp1 (t2), Vp2 (t2)} = {VS1, VS2}
OUTPUT CONVERSION UNIT
7
CORRECTION UNIT
8
SELECTION UNIT
DETECTION UNIT
DETECTION CIRCUIT p1
Vp1 (t1) = VS0 + N (t1)
DETECTION CIRCUIT p2
Vp2 (t1) = VS2 + N (t1)
5
4
SENSOR UNIT
2
DETECTION TARGET
S0
S1
S2

R1 R1 R3 R3

$$Z_1=\begin{pmatrix}1&0&0&0\\0&1&0&0\end{pmatrix}\quad Z_2=\begin{pmatrix}1&0&0&0\\0&0&0&1\end{pmatrix}\quad Z_3=\begin{pmatrix}0&0&1&0\\0&1&0&0\end{pmatrix}\quad Z_4=\begin{pmatrix}0&0&1&0\\0&0&0&1\end{pmatrix}$$

R2 R4 R2 R4

1
2
3
4
5
6
7
8
SENSOR UNIT
S00
S01
S02
S10
S11
S12
S20
S21
S22
CIRCUIT UNIT
CONTROL UNIT
SELECTION UNIT
DETECTION UNIT
DETECTION CIRCUIT 1
DETECTION CIRCUIT 2
DETECTION CIRCUIT 3
OUTPUT CONVERSION UNIT
CORRECTION UNIT 1
3
CIRCUIT UNIT
6
CONTROL UNIT
$\{V_{p1}(t_0), V_{p2}(t_0)\} = \{V_{S_0}+V_{S_1}, V_{S_2}+V_{S_3}\}$
$\{V_{p1}(t_1), V_{p2}(t_1)\} = \{V_{S_0}+V_{S_1}, V_{S_2}-V_{S_3}\}$
$\{V_{p1}(t_2), V_{p2}(t_2)\} = \{V_{S_0}-V_{S_1}, V_{S_2}-V_{S_3}\}$
OUTPUT CONVERSION UNIT
7
2
DETECTION TARGET
SENSOR UNIT
$S_3$
$S_2$
$S_1$
$S_0$
SELECTION UNIT
COMPOSITE VALUE CALCULATION UNIT
DETECTION UNIT
DETECTION CIRCUIT $p_1$
$V_{p1}(t_1) = \{V_{S_0}+V_{S_1}+N(t_1)$
DETECTION CIRCUIT $p_2$
$V_{p2}(t_1) = \{V_{S_2}+V_{S_3}+N(t_1)$
CORRECTION UNIT
8
4
9
5

MEASUREMENT DEVICE AND MEASUREMENT METHOD AND MEASUREMENT PROGRAM THEREFOR

CLAIM OF PRIORITY

This application is a Continuation of International Application No. PCT/JP2021/024694 filed on Jun. 30, 2021, which claims benefit of Japanese Patent Application No. 2020-132842 filed on Aug. 5, 2020. The entire contents of each application noted above are hereby incorporated by reference.

BACKGROUND OF THE INVENTION

1. Field of the Invention

The present disclosure relates to a measurement device, a measurement method, and a measurement program therefor.

2. Description of the Related Art

Sensors configured to quantify physical phenomena that occur in a specific space are widely used in various technical fields. Examples of such sensors include capacitive touch sensors used in touch panels, imaging sensors used in digital cameras or the like, more complex 3D image sensors, etc. Such a sensor is generally used to perform measurements continuously, and thus a measurement value obtained in each measurement includes noise specific to a time when the measurement is performed (hereinafter, such noise is referred to as "time-dependent noise").

In order to reduce an influence of such time-dependent noise, for example, U.S. Pat. No. 8,976,145 discloses a method in which the time-dependent noise included in each measurement value is equalized to a reference value of time-dependent noise included in a measurement value obtained in a certain measurement thereby equalizing time-dependent noise included in measurement values.

However, in the method disclosed in U.S. Pat. No. 8,976,145, depending on the magnitude of the equalized noise component, each measurement value include an equal large noise component, which may cause a large influence to be exerted on a detection result.

SUMMARY OF THE INVENTION

In view of the above situation, the present disclosure provides a measurement device capable of effectively reducing an influence of time-dependent noise, and a measurement method and a measurement program therefor.

According to a first aspect of the present disclosure, there is provided a measurement device including N (N≥2) sensors, a selection unit configured to select a predetermined combination of sensors from the N sensors in each measurement and output a detection value to each of M sensor terminals (M<N) based on measurement values provided by the selected sensors, an acquisition unit configured to acquire the detection value output to each of the M sensor terminals in each measurement, and a correction unit configured to, after the measurement is performed L times, based on an assumption that each of M×L detection values acquired by the acquisition unit includes a time-dependent noise component, correct each of the M×L detection values such that the time-dependent noise component of each of the detection values is replaced by a common noise component obtained by averaging the L time-dependent noise components along a time axis.

According to a second aspect of the present disclosure, there is provided a measurement method for a measurement device including N (N≥2) sensors, including steps of selecting a predetermined combination of sensors from the N sensors in each measurement and outputting a detection value to each of M sensor terminals (M<N) based on measurement values provided by the selected sensors, acquiring the detection value output to each of the M sensor terminals in each measurement, and after the measurement is performed L times, based on an assumption that each of M×L detection values acquired by the acquisition unit includes a time-dependent noise component, correcting each of the M×L detection values such that the time-dependent noise component of each of the detection values is replaced by a common noise component obtained by averaging the L time-dependent noise components along a time axis.

According to a third aspect of the present disclosure, there is provided a measurement program for a measurement device including N (N≥2) sensors, configured to cause a computer to execute a process, the process including selecting a predetermined combination of sensors from the N sensors in each measurement and outputting a detection value to each of M sensor terminals (M<N) based on measurement values provided by the selected sensors, acquiring the detection value output to each of the M sensor terminals in each measurement, and after the measurement is performed L times, based on an assumption that each of M×L detection values acquired by the acquisition unit includes a time-dependent noise component, correcting each of the M×L detection values such that the time-dependent noise component of each of the detection values is replaced by a common noise component obtained by averaging the L time-dependent noise components along a time axis.

DESCRIPTION OF THE PREFERRED EMBODIMENTS

First Embodiment

A measurement device, a measurement method, and a measurement program therefor according to a first embodiment of the present disclosure are described below with reference to the drawings. The measurement device 1 according to the first embodiment is a measurement device configured to measure a physical phenomenon occurring in a predetermined space. The physical phenomenon may be measured and quantified using, for example, a sensor. One example is a sensor used in an input device or the like. More specifically, the measurement device 1 can be applied to a capacitive touch sensor used in a touch panel, a sensor for slider input, an imaging sensor used in a digital camera or the like, a three-dimensional image sensor, and the like. In the following description, an example is described for a case where the measurement device according to the present disclosure is applied to a capacitive touch sensor that is used in a touch panel to detect the position of a detection target (for example, a finger).

Configuration of Measurement Device 1

Figure 1:
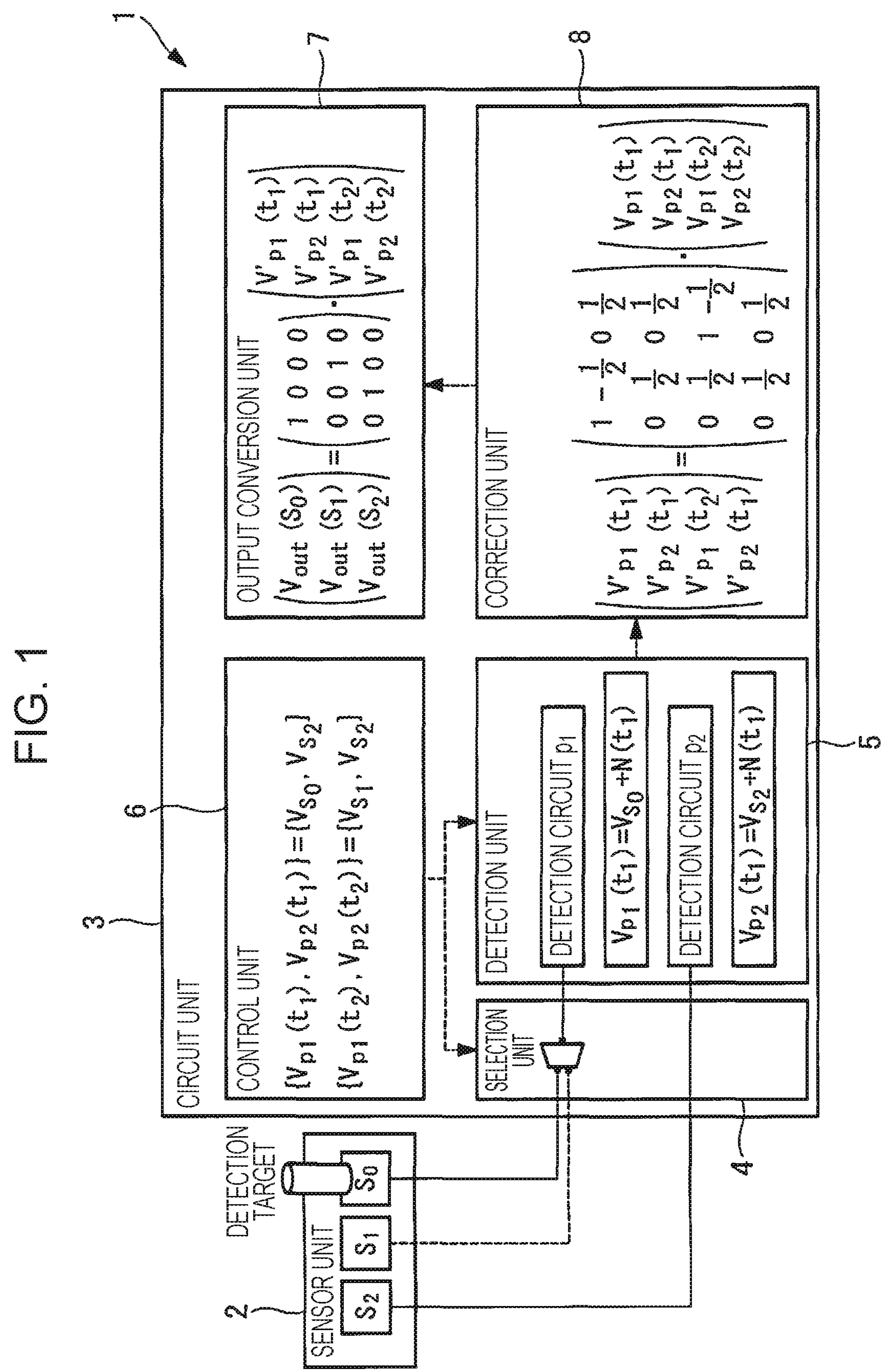
FIG. 1 is a diagram illustrating a system configuration of a measurement device according to a first embodiment of the present disclosure.

FIG. 1 is a diagram showing a system configuration of the measurement device 1 according to the first embodiment of the present disclosure. As shown in FIG. 1, the measurement device 1 according to the present embodiment includes, as main components, a sensor unit 2 and a circuit unit 3. The circuit unit 3 includes, as main components, a selection unit 4, a control unit 6, a detection unit (acquisition unit) 5, a correction unit 8, and an output conversion unit (restoration unit) 7.

The sensor unit 2 includes N (N≥2) sensors. It is assumed in the present embodiment that the measurement device is applied to a touch panel, and thus, for example, a capacitive proximity sensor (a capacitance sensor) is used as each sensor. FIG. 1 illustrates a simplified spatial distribution sensor. In the following description, it is assumed, by way of example, that three sensors (a sensor $S_0$, a sensor $S_1$, and a sensor $S_2$) are provided (that is, the number of sensors is N=3), but the number of sensors is not limited to 3.

Each sensor outputs a measurement value indicating the degree of proximity. The closer an object (for example, a finger or a touch pen) is to the sensor in the detection space of the sensor, the higher the numerical value output as the measurement result.

The selection unit 4 selects a predetermined combination of sensors from the N sensors in each measurement, and outputs a detection value to each of M sensor terminals (M<N) based on measurement values provided by the selected sensors. The touch sensor or a similar device includes a large number of sensors. However, from the viewpoint of the circuit area, cost, etc., it is not realistic to provide as many detection circuits $p_1$ and $p_2$ described later as the number of sensors. Therefore, the number of detection circuits $p_1$ and $p_2$ is smaller than the number of sensors (N=3). Thus, the selection unit 4 is configured to select the predetermined combination of sensors and output the detection values of the selected sensors to the detection circuits $p_1$ and $p_2$. The combination of sensors to be selected is preset for each of a plurality of measurements. In particular, in measurements, the selection unit 4 selects the combination of sensors such that the combination is different from a combination employed in a previous measurement.

In the example shown in FIG. 1, there are three sensors ($S_0$ to S2), but there are only two detection circuits $p_1$ and $p_2$. Therefore, at a measurement timing, two measurement values are selected from those provided by the sensors and the selected measurement values are input to the respective detection circuits $p_1$ and $p_2$.

The control unit 6 controls the selection unit 4 to select the predetermined combination of sensors in each measurement. The combinations of sensors to be selected are preset in the control unit 6. For example, when the number of times L the measurement is to be executed is 2, combination patterns are set such that at time $t_1$, the detection value from the sensor $S_0$ is input to the detection circuit $p_1$ and the detection value from the sensor $S_2$ is input to the detection circuit $p_2$, and at subsequent time $t_2$, the detection value from the sensor $S_1$ is input to the detection circuit $p_1$, and the detection value from the sensor $S_2$ is input to the detection circuit $p_2$.

Measurements are performed at predetermined time intervals or at predetermined timings. More specifically, the control unit 6 controls the selection unit 4 and the detection unit (the acquisition unit) 5 to perform the measurement L times at predetermined time intervals or at predetermined timings. That is, the control unit 6 performs control such that each measurement is performed at preset measurement intervals. When the measurement interval is preset to be short, it can be expected that the change in the true value is suppressed. More specifically, it is preferable to complete all L measurement executions before an assumed environmental change occurs. For example, let it be assumed that the count value of the sensor changes from 0 to 100 as a finger approaches, and that the count value changes from 0 to 100 in 1 second in a fastest case. If this sensor performs the measurement L times in one second, the change in the count value from 0 to 100 occurs in a period in which the L measurement executions are completed. However, if it is possible to perform the measurement L times in 0.01 seconds, the change in the count value that occurs in a period in which the L measurement executions are completed can be reduced to 1. As can be seen from the above-discussion, it is desirable to complete the measurement the predetermined number of times in as short a time as possible.

The detection unit (the acquisition unit) 5 acquires a detection value output to each of the M sensor terminals in each measurement. More specifically, the detection unit 5 has as many scan matrices $Z_i$ (0≤i≤L), each of which is a matrix of M rows and N columns, as the number of times L the measurement is to be executed, and in an i-th detection operation, measurement values of sensors selected based on Zi are acquired as detection values. The detection unit 5 has M detection circuits connected to the respective sensor terminals. In the i-th detection operation, in a case where a detection circuit j is connected to a sensor k, 1 is stored in a component in a j-th row and a k-th column of the matrix $Z_i$, while in a case where the detection circuit j is not connected to the sensor k, 0 is stored in the component in the j-th row and the k-th column of the matrix $Z_i$. In the present embodiment, the detection unit 5 includes a detection circuit $p_1$ and a detection circuit $p_2$ (M=2), and measures physical quantities by three sensors $S_0$, $S_1$, and $S_2$ (N=3) in two scanning operations (L=2). To achieve the above measurement, the detection unit 5 has matrices $Z_1$ and $Z_2$ each of which is a matrix of 2 rows and 3 columns. Ideally, true values of the respective sensors (values including no noise components) are input to the detection circuits $p_1$ and $p_2$. However, the values actually detected by the detection circuits $p_1$ and $p_2$ include noise components (time-dependent noise components).

More specifically, in a case where in the measurement at time $t_1$, noise $N_{p1}(t_1)$ appears in a detection value $V_{p1}(t_1)$ input to the detection circuit $p_1$ and noise $N_{p2}(_2)$ appears in a detection value $V_{p2}(t_1)$ input to the detection circuit $p_2$, if $N(t_1)$ is a time-dependent noise component that appears equally in both the detection circuit $p_1$ and the detection circuit $p_2$, then $N_{p1}(t_1)=N(t_1)$ and $N_{p2}(t_1)=N(t_1)$. That is, in the measurements performed at the same timing, the noise components input to the detection circuits $p_1$ and $p_2$ are equal. Since the locations of the sensors are close to each other, noise components that appear individually in the detection circuit $p_1$ and the detection circuit $p_2$ are small compared to the noise component $N(t_1)$, and thus these individual noise components are ignored.

On the other hand, the noise component is dependent on time. That is, the noise component varies depending on the measurement timing. For example, at time $t_2$, the noise component $N(t_2)$ is different from $N(t_1)$.

In the present embodiment, in the first-time measurement performed at time $t_1$, the selection unit 4 performs a selection according to the scan matrix $Z_1$ such that, at time $t_1$, the detection value from the sensor $S_0$ is input to the detection circuit $p_1$, and the detection value from the sensor $S_2$ is input to the detection circuit $p_2$. At subsequent time $t_2$, the detection value from the sensor $S_1$ is input to the detection circuit $p_1$, and the detection value from the sensor $S_2$ is input to the detection circuit $p_2$. Thus, the detection value $V_{p1}(t_1)$ input to the detection circuit $p_1$ at time $t_1$ is given by following Equation (1), and the detection value $V_{p2}(t_1)$ input to the detection circuit $p_2$ at time $t_1$ is given by following Equation (2):

$$V_{p1}(t_1)=V_{S0}+N(t_1) \tag{1}$$

$$V_{p2}(t_1)=V_{S2}+N(t_1) \tag{2}$$

where $V_{S0}$ is the true value of the detection value detected by the sensor $S_0$, and $V_{S2}$ is the true value of the detection value detected by the sensor $S_2$. Note that the true value refers to an ideal noise-free detection value detected by a sensor.

Similarly, at time $t_2$, the selection unit 4 performs a selection according to the scan matrix $Z_2$ such that the detection value $V_{p1}(t_2)$ given by following Equation (3) is input to the detection circuit $p_1$ at time $t_2$, and the detection value $V_{p2}(t_2)$ given by following Equation (4) is input to the detection circuit $p_2$ at time $t_2$:

$$V_{p1}(t_2)=V_{S1}+N(t_2) \tag{3}$$

$$V_{p2}(t_2)=V_{S2}+N(t_2) \tag{4}$$

where $V_{S1}$ is the true value of the detection value detected by the sensor $S_1$. As described above, the detection values input to the respective detection circuits $p_1$, and $p_2$ are dependent on the combination of sensors selected in each measurement. When the measurement has been performed the specified number of times, each piece of detected information is output to the correction unit 8 described below.

In the correction unit 8, it is assumed that, after the measurement is performed L times, each of the M×L detection values acquired by the detection unit (the acquisition unit) 5 includes a time-dependent noise component. The correction unit 8 corrects each of the M×L detection values such that the time-dependent noise component included in each detection value is equal to a common noise component given by a value obtained by averaging the L time-dependent noise components along the time axis. As described above, the common noise component is the average value of the time-dependent noise components included in the detection values. More specifically, the correction unit 8 calculates each correction value (each corrected detection value) using detection values detected in the measurement executed at a plurality of times, based on an assumption that each detection value includes a time-dependent noise component occurring at each measurement time, such that each corrected value (each corrected detection value) is given by a value obtained by adding an average value of a predetermined number of time-dependent noise components to a true value.

More specifically, when the detection values are represented by column vector $V_{in}=\{V_{p1}(t_1), V_{p2}(t_1), V_{p1}(t_2), V_{p2}(t_2)\}^T$, the correction unit 8 makes the correction in terms of noise components by multiplying the column vector $V_{in}$ by a transformation matrix $M_{decode}$. The column vector $V_{in}$ can be represented by an (L×M)-dimensional column vector (a matrix including L×M elements arranged in the vertical direction) where L denotes the number of times that the measurement is executed and M denotes the number of detection values obtained in one measurement execution (that is, the M denotes the number of detection circuits). In the present embodiment, the column vector $V_{in}$ has 2×2=4 dimensions. The transformation matrix converts a 4-dimensional column vector into a column vector of the same dimensions, and thus the transformation matrix is a 4×4 matrix such as that shown in Equation (5) described below.

$$M_{decode}=\begin{pmatrix} 1 & -\frac{1}{2} & 0 & \frac{1}{2} \\ 0 & \frac{1}{2} & 0 & \frac{1}{2} \\ 0 & \frac{1}{2} & 1 & -\frac{1}{2} \\ 0 & \frac{1}{2} & 0 & \frac{1}{2} \end{pmatrix} \tag{5}$$

The transformation matrix in Equation (5) is an example corresponding to the column vector according to the present embodiment. The derivation of Equation (5) will be described later. Thus, the column vector $V_{in}$ with 4 rows is corrected to a column vector $V'_{in}$ with 4 rows using the matrix $M_{decode}$ with 4 rows and 4 columns. When $V'_{in}$ is represented by $V'_{in}=\{V'_{p1}(t_1), V'_{p2}(t_1), V'_{p1}(t_2), V'_{p2}(t_2)\}^T$, the correction is made as represented by following equation (6).

$$\begin{aligned} V'_{in} &= \begin{pmatrix} V'_{p1}(t_1) \\ V'_{p2}(t_1) \\ V'_{p1}(t_2) \\ V'_{p2}(t_2) \end{pmatrix} \\ &= M_{decode}\cdot V_{in} \\ &= \begin{pmatrix} 1 & -\frac{1}{2} & 0 & \frac{1}{2} \\ 0 & \frac{1}{2} & 0 & \frac{1}{2} \\ 0 & \frac{1}{2} & 1 & -\frac{1}{2} \\ 0 & \frac{1}{2} & 0 & \frac{1}{2} \end{pmatrix} \cdot \begin{pmatrix} V_{p1}(t_1) \\ V_{p2}(t_1) \\ V_{p1}(t_2) \\ V_{p2}(t_2) \end{pmatrix} \\ &= \begin{pmatrix} V_{S0}+\frac{N(t_1)+N(t_2)}{2} \\ V_{S2}+\frac{N(t_1)+N(t_2)}{2} \\ V_{S1}+\frac{N(t_1)+N(t_2)}{2} \\ V_{S2}+\frac{N(t_1)+N(t_2)}{2} \end{pmatrix} \end{aligned} \tag{6}$$

By converting the column vector $V_{in}$ by $M_{decode}$ as represented in Equation (6), each element of the corrected column vector $V'_{in}$ is corrected to a value obtained by adding the offset noise given by the average value of time-dependent noise to the true value of a corresponding sensor. That is, the same common noise component is added to each detection value. In other words, the correction unit 8 obtains the common noise component by calculating the average value of the L time-dependent noise components. That is, the correction unit 8 corrects each of the M×L detection values using the correction matrix $M_{decode}$ having M×L rows and M×L columns such that each corrected detection value is the sum of a true value and the common noise component. Each corrected detection value is output to the output conversion unit 7 described below.

The output conversion unit 7 calculates detection results corresponding to the respective N sensors based on the M×L detection values corrected by the correction unit 8. That is, the output conversion unit 7 calculates the detection results corresponding to the respective sensors $S_0$, $S_1$, and $S_2$ using the corrected detection values. More specifically, the column vector $V'_{in}$ obtained according to Equation (6) is converted to values corresponding to the respective sensors. For example, when the detection results corresponding to the respective sensors $S_0$, $S_1$, and $S_2$ are given as $\{V'_{S0}, V'_{S1}, V'_{S2}\}^T$, the conversion is performed using a transformation matrix $M_{out}$ as shown in Equation (7) described below.

$$\begin{pmatrix} V'_{S0} \\ V'_{S1} \\ V'_{S2} \end{pmatrix} = M_{out} \cdot V'_{in} = \begin{pmatrix} 1 & 0 & 0 & 0 \\ 0 & 0 & 1 & 0 \\ 0 & 1 & 0 & 0 \end{pmatrix} \cdot \begin{pmatrix} V_{S0} + \frac{N(t_1)+N(t_2)}{2} \\ V_{S2} + \frac{N(t_1)+N(t_2)}{2} \\ V_{S1} + \frac{N(t_1)+N(t_2)}{2} \\ V_{S2} + \frac{N(t_1)+N(t_2)}{2} \end{pmatrix} \tag{7}$$

That is, the output conversion unit 7 outputs the detection results corresponding to the respective N sensors by applying a restoration matrix $M_{out}$ with N rows and M×L columns to the corrected M×L detection values. Values of matrix elements of respective rows of $M_{out}$ can affect the magnitude of the final offset noise. For example, if the sum in the row direction is different for each row, an irregularity occurs. Therefore, it is preferable that $M_{out}$ be set such that the sum in the row direction is equal for each row. The smaller the sum in the row direction, the smaller the resultant magnitude of the offset. A method of obtaining zero in the sum in the row direction thereby canceling noise will be described later referring to a second embodiment.

Thus, $V'_{S0}$, $V'_{S1}$ and $V'_{S2}$ are obtained as detection results corresponding to the respective sensors $S_0$, $S_1$ and $S_2$. These detection results have values obtained by adding the average value of the noise components as the common noise component to the true values measured by the respective sensor $S_0$, $S_1$ and $S_2$, and thus the noise components related to the true values are equalized and variations in the influence of the time-dependent noise components are suppressed.

In the present embodiment, the correction unit 8 performs processing using $M_{decode}$, and the output conversion unit 7 performs processing using $M_{out}$. However, instead of performing the processing separately, the matrices may be combined into a single matrix as $M_{out} \cdot M_{decode}$, and the calculation processing may be performed simultaneously using the resultant single transformation matrix.

In the present embodiment, the equalizing of the offset noise is achieved by the average value of the time-dependent noise. However, the common noise component is not limited to the average value as long as it is calculated by performing statistical processing on the time-dependent noise. However, to effectively suppress the influence of the difference among the time-dependent noise, it is preferable to use the average value.

<Hardware Configuration of Measurement Device 1>

Figure 2:
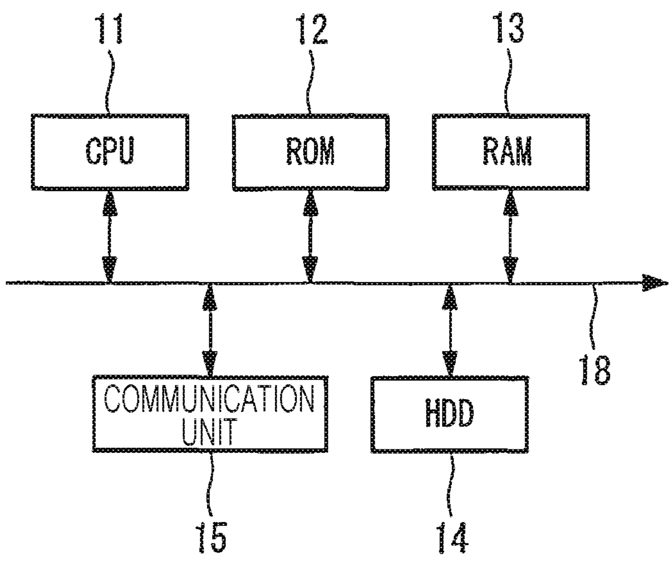
FIG. 2 is a diagram illustrating an example of a hardware configuration of the measurement device according to the first embodiment of the present disclosure.

FIG. 2 is a diagram illustrating an example of a hardware configuration of the measurement device 1 according to the present embodiment.

As shown in FIG. 2, the measurement device 1 includes a processor (a computer system). The measurement device 1 includes, for example, a CPU 11, a ROM (Read Only Memory) 12 for storing programs executed by the CPU 11, a RAM (Random Access Memory) 13 that functions as a work area in executing each program, a hard disk drive (HDD) 14 functioning as a mass storage device, a communication unit 15 for connecting to a network or the like. A solid state drive (SSD) may be used as the mass storage device. These units are connected via a bus 18.

The measurement device 1 may include an input unit such as a keyboard and a mouse, and a display unit such as a liquid crystal display device for displaying data.

The storage medium for storing programs and the like executed by the CPU 11 is not limited to the ROM 12. For example, other auxiliary storage devices such as magnetic disks, magneto-optical disks, semiconductor memories, or the like may be used.

<Flow of Processing by Measurement Device 1>

Figure 3:
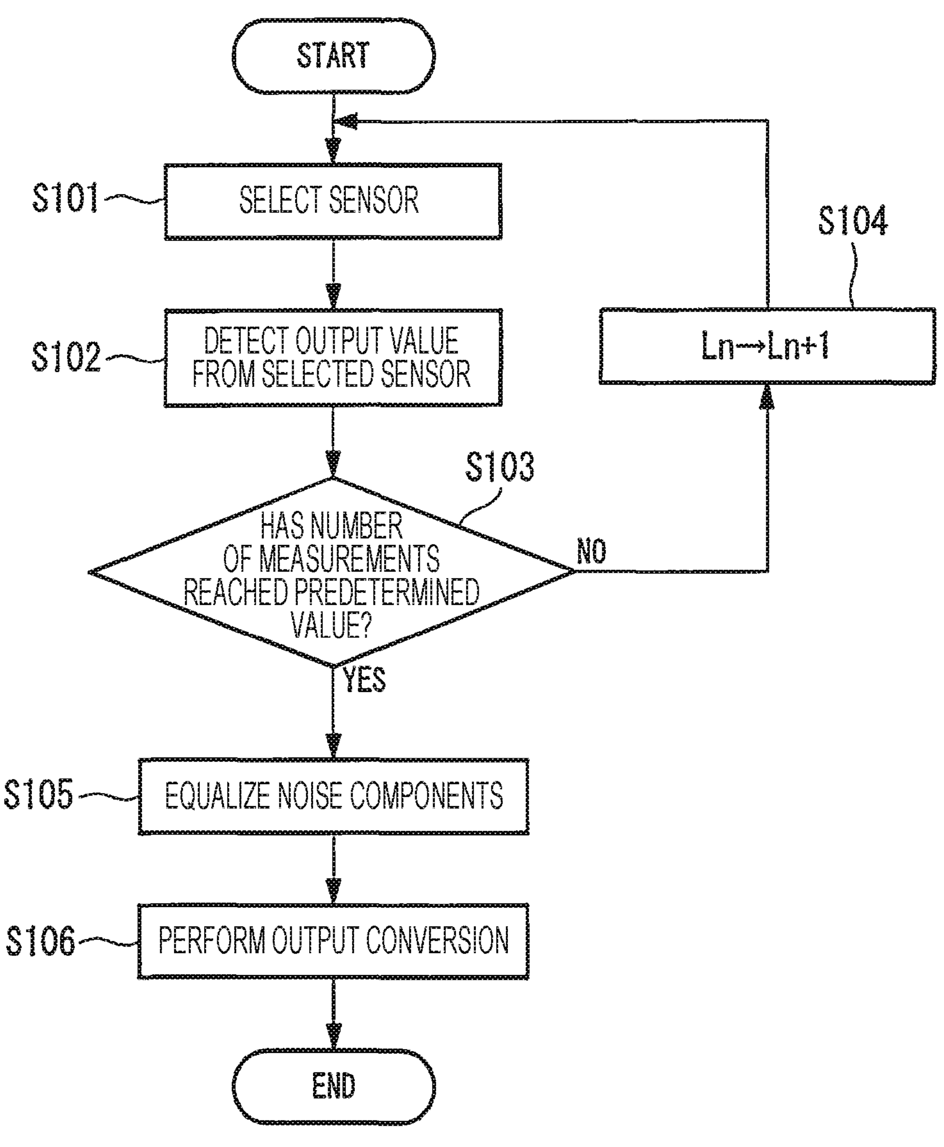
FIG. 3 is a flowchart illustrating an example of a procedure of processing performed by the measurement device according to the first embodiment of the present disclosure.

Next, an example of processing by the measurement device 1 is described with reference to FIG. 3. FIG. 3 is a flowchart illustrating an example of a procedure of processing performed by the measurement device 1 according to the present embodiment. The flow shown in FIG. 3 is executed, for example, when a measurement is started. The measurement is continuously performed by repeatedly executing the flow shown in FIG. 3 at predetermined time intervals.

For example, the series of processes described below are stored in the form of a program in the hard disk drive 14 (see FIG. 2) or the like, and the CPU 11 reads out this program into the RAM 13 or the like and executes information processing/calculation processing, thereby realizing various functions described below. The program may be pre-installed in the ROM 12 or other storage media, or may be provided by being stored in a computer-readable storage medium, or distributed via wired or wireless communication means. Examples of computer-readable storage media include a magnetic disk, a magneto-optical disk, a CD-ROM, a DVD-ROM, a semiconductor memory, etc.

First, the selection unit 4 selects a combination of sensors corresponding to the Ln-th execution of the measurement (S101). The initial value of Ln is 1, and when S101 is executed for the first time, a combination corresponding to Ln=1 is adopted.

Next, the detection unit 5 detects detection values from the respective selected sensors (S102).

Next, it is determined whether or not the number of times the measurement has been executed has reached a predetermined value (S103). In the present embodiment, the predetermined value is set to two. The determination process in S103 is performed, for example, by the control unit 6.

In a case where the number of times the measurement has been executed has not reached the predetermined value (NO in the determination in S103), the count of the number of times the measurement has been executed is incremented by 1 as Ln→Ln+1 (S104), and S101 is executed again. The determination process in S104 is performed, for example, by the control unit 6.

When the number of times the measurement has been executed has reached the predetermined value (YES in the determination in S103), the correction unit 8 performs the correction to equalize noise components in the detection values detected in the respective measurement executions (S105). More specifically, in S105, the conversion is performed according to Equation (6).

Next, the output conversion unit 7 performs an output conversion based on each corrected detection value, and calculates a detection result corresponding to each sensor (S106). More specifically, in S106, the conversion is performed according to Equation (7).

The process described above is performed by the measurement device 1 as described above, and thus the offset of the noise is equalized.

<Effects of Equalization of Offset Noise>

Next, the effects of the equalization of the offset noise by the above-described processing is described.

The column vector $V_{in}$ can be expressed using a matrix as a product of a transformation matrix $M_{scan}$ and a column vector $V_{ideal}$ as shown in Equation (8).

$$V_{in} = \begin{pmatrix} V_{p1}(t_1) \\ V_{p2}(t_1) \\ V_{p1}(t_2) \\ V_{p2}(t_2) \end{pmatrix} = M_{scan} \cdot V_{ideal} \begin{pmatrix} 1 & 0 & 0 & 1 & 0 \\ 0 & 0 & 1 & 1 & 0 \\ 0 & 1 & 0 & 0 & 1 \\ 0 & 0 & 1 & 0 & 1 \end{pmatrix} \cdot \begin{pmatrix} V_{S0} \\ V_{S1} \\ V_{S2} \\ N(t_1) \\ N(t_2) \end{pmatrix} \tag{8}$$

Therefore, Equation (6) can be rewritten as Equation (9) shown below.

$$\begin{aligned} V'_{in} &= M_{decode} \cdot V_{in} \\ &= M_{decode} \cdot M_{scan} \cdot V_{ideal} \\ &= \begin{pmatrix} 1 & 0 & 0 & \frac{1}{2} & \frac{1}{2} \\ 0 & 0 & 1 & \frac{1}{2} & \frac{1}{2} \\ 0 & 1 & 0 & \frac{1}{2} & \frac{1}{2} \\ 0 & 0 & 1 & \frac{1}{2} & \frac{1}{2} \end{pmatrix} \cdot \begin{pmatrix} V_{S0} \\ V_{S1} \\ V_{S2} \\ N(t_1) \\ N(t_2) \end{pmatrix} \end{aligned} \tag{9}$$

As is clear from Equation (9) (and other equations such as Equation (7)), all noise components are halved and added to the true value. That is, the offset noise is replaced by the average value of $N(t_1)$ and $N(t_2)$, and thus the offset noise is equalized.

For example, let it be assumed that $V_{S0}$ is 100, $V_{S1}$ is 40, and $V_{S2}$ is 10. This is an example of the detection result obtained when a finger is at a position closest to the sensor $S_0$. Furthermore let be assumed that $N(t_1)$ is 100 and $N(t_2)$ is −20. In this situation, if the noise equalization such as that described above is not performed, $V_{S0}+N(t_1)=100+100=200$, $V_{S1}+N(t_2)=40-20=20$, and $V_{S2}+N(t_1)=10+100=110$. That is, even though the finger is at the position closest to the sensor $S_0$, there is a possibility that the influence of the noise can cause the finger to be erroneously detected as being located near the sensor $S_0$ and the sensor $S_2$.

In this same situation, for example, if the noise is adjusted to either one of $N(t_1)$ and $N(t_2)$ (for example, let it be here assumed that the noise is adjusted to $N(t_1)$), then $V_{S0}+N(t_1)=100+100=200$, $V_{S1}+N(t_1)=40+100=140$, and $V_{S2}+N(t_1)=10+100=110$. That is, when $N(t_1)$ is large, a large offset appears and there is a possibility that the true value is buried in noise.

In contrast, in the present embodiment, the offset noise included in the detection value is given by the average value of a plurality of noise components obtained at different measurement times. That is, the offset noise included in each measurement value is given by $(N(t_1)+N(t_2))/2=40$, and thus the absolute value of the offset noise can be reduced.

In general, numerical values that change randomly like noise are often likened to a normal distribution. It is known that the normal distribution has a characteristic that when k samples are extracted from a normal distribution with a mean of 0 and a variance $\sigma^2$ and summed together, the result is a normal distribution with a mean of 0 and a variance $K\times\sigma^2$. It is also known that when samples of a normal distribution with a mean of 0 and a variance $\sigma^2$ are multiplied by 1/K, the result is a normal distribution with a mean of 0 and a variance $(\sigma/K)^2$. Therefore, if it is assumed that the noise component N(t) follows a normal distribution with a mean of 0 and a variance $\sigma^2$, when noise components multiplied by 1/K are summed K times, the numerical values thereof will follow a normal distribution with a mean of 0 and a variance $(\sigma)^2/K$. That is, the offset variance is reduced by a factor of 1/K.

From the above discussion, it can be said that the present embodiment can effectively reduce the influence of noise, and can improve the measurement accuracy.

<Description of Scan Matrix $Z_i$ and Transformation Matrix $M_{decode}$>

Next, a description is given below as to the scan matrix $Z_i$ and the transformation matrix $M_{decode}$ that enable offset noise equalization according to the present disclosure.

Conditions of $Z_i$

Any of scan matrices $Z_i$ and $Z_j$ ($0\le i<j<L$) of the detection circuit according to the present disclosure satisfies a condition a or a condition b described below.

Condition a

There exist p and q such that a p-th row component of $Z_i$ and a q-th row component of $Z_j$ are equal ($0\le p, q<M$).

Condition b

There exist $p_0$, $q_0$, and $k_0$ such that a $p_0$th row component of $Z_i$ and a $q_0$th row component of $Z_{k0}$ are equal ($0\le p_0, q_0<M, 0\le k_0<L$);

there exist $p_1$, $q_1$, and $k_1$ such that a $p_1$th row component of $Z_{k0}$ and a $q_1$th row component of $Z_{k1}$ are equal ($0\le p_1, q_1<M, 0\le k_0, k_1<L$);

there exist $p_1$, $q_2$, $k_1$, and $k_2$ such that a $p_1$th row component of $Z_{k1}$ and a $q_2$th row component of $Z_{k2}$ are equal ($0\le p_2, q_2<M, 0\le k_1, k_2<L$);

. . .

there exist $p_{x-1}$, $q_{x-1}$, $k_{x-1}$, and $k_x$ such that a $p_{x-1}$th row component of $Z_{kx-1}$ and a $q_{x-1}$th row component of $Z_{kx}$ are equal ($0\le p_{x-1}, q_{x-1}<M, 0\le k_{x-1}$, and $k_x<L$); and there exists $p_x$, $q_x$, and $k_x$ such that a $p_x$th row component of $Z_{kx}$ and a $q_x$th row component of $Z_j$ are equal ($0\le p_x, q_x<M, 0\le k_x, j<L, 0<x<L-1$).

Figures 4A, 4B:
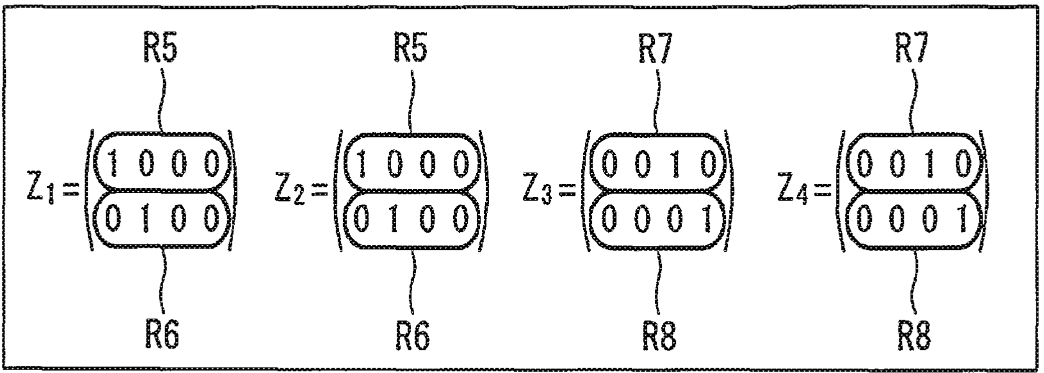
FIGS. 4A and 4B each are a diagram showing an example of a scan matrix according to the first embodiment of the present disclosure.

For example, as shown in FIG. 4A, each of $Z_1$ to $Z_4$ satisfies the condition a or the condition b for $Z_i$ and $Z_j$. More specifically, the condition a is satisfied when i=1 and j=2. That is, the first row of $Z_1$ and the first row of $Z_2$ are equal, as with $R_1$ in $Z_1$ and $Z_2$ in FIG. 4A. For i=1 and j=4, the condition a is not satisfied (the rows of $Z_1$ and the rows of $Z_4$ in FIG. 4A are all different), but the condition b is satisfied. That is, as with $R_2$ in $Z_1$ and $Z_3$ in FIG. 4A, the second row of $Z_1$ and the second row of $Z_3$ are equal, and, as with $R_3$ in $Z_3$ and $Z_4$ in FIG. 4A, the first row of $Z_3$ and the first row of $Z_4$ are equal. The second row of $Z_2$ and the second row of $Z_4$ are equal, as with R4 in $Z_2$ and $Z_4$ in FIG. 4A.

On the other hand, in the case of each of the scan matrices $Z_1$ to $Z_4$ such as those shown in FIG. 4B, the conditions are not satisfied for some i or j, and thus they cannot be used as arbitrary scan matrices of the detection circuit according to the present disclosure. In FIG. 4B, rows of each matrix are denoted by corresponding ones of R5 to R8.

When the scan matrices $Z_i$ are prepared as described above, a following proposition M1 holds.

Proposition M1

In a case where a scan matrix $Z_i$ satisfies the condition a or the condition b, there always exists D(i, j) that satisfies Equation (10) described below for any i and j.

$$D(i,j)V_{in}=N(t_i)-N(t_j) \tag{10}$$

Proof of Proposition M1

Since D(j, i)=−D(i, j), when the proposition M1 holds for i<j, the proposition M1 also holds for i>j. Therefore, the proof is provided below only for a case where i<j. First, the proof is made for a case where the condition a is satisfied.

When the condition a is satisfied for some i and j (i<j), from the definition of the condition a, the scanning setting of the detection circuit p at time $t_i$ is the same as the scanning setting of the detection circuit q at time $t_j$, and thus the detection values $V_p(t_i)$ and $V_q(t_j)$ are equal to each other except for noise components. Therefore, when D(i, j) is a row vector in which 1 is put in the (p+M*i)th column corresponding to $V_p(t_i)$, −1 is put in the (q+M*j)th column corresponding to Vq(tj), and 0 is put other columns. the value of D(j, j)$V_{in}$ is given by a value obtained by subtracting $V_q(t_j)$ from $V_p(t_i)$, and thus Equation (11) holds.

$$D(i,j)V_{in}=V_p(t_i)-V_q(t_j)=N(t_i)-N(t_j) \tag{11}$$

Therefore, when i and j satisfy the condition a, the proposition M1 is true.

Next, the proof is made for the case where the condition b is satisfied. When i and j satisfy the condition b, the following Equation (12) holds by the definition.

$$\begin{gathered}
V_{p_0}(t_i)-V_{q_0}(t_{k_0})=N(t_i)-N(t_{k_0})\\
V_{p_1}(t_{k_0})-V_{q_1}(t_{k_1})=N(t_{k_0})-N(t_{k_1})\\
V_{p_2}(t_{k_1})-V_{q_2}(t_{k_2})=N(t_{k_1})-N(t_{k_2})\\
\vdots\\
V_{p(x-1)}(t_{k(x-1)})-V_{q(x-1)}(t_{k_x})=N(t_{k(x-1)})-N(t_{k_x})\\
V_{p_x}(t_{k_x})-V_{q_x}(t_j)=N(t_{r_x})-N(t_j)
\end{gathered} \tag{12}$$

Adding the left sides of Equation (12) together and adding right sides of Equation (12) together yields Equation (13) shown below.

$$V_p(t_i)+\sum_{u=0}^{x-1}\left(V_{p(u+1)}(t_{k_u})-V_{q_u}(t_{k_u})\right)-V_{q_x}(t_j)=N(t_i)-N(t_j) \tag{13}$$

Therefore, if it is shown that when $V_{in}$ is multiplied by D(i, j), the left side of Equation (13) is obtained, then it is shown that the proposition M1 holds. That is, when D(i, j) is given by a row vector in which 1 is put in (p+M*i)th column corresponding to $V_{p0}(t_i)$, 1 is put in ($p_{(u+1)}$+M*$k_u$)th column corresponding to $V_{p(u+1)}(t_{ku})$, −1 is put in ($q_u$+M*$k_u$) th column corresponding to $V_{qu}(t_{ku})$, −1 is put in ($q_x$+M*j)th column corresponding to $V_{qx}(t_j)$, and 0 is put in the other elements, then values of D(j, j)$V_{in}$ are given by the left side of Equation (13), and, as a result, following Equation (14) holds.

$$D(i,j)V_{in}=V_p(t_i)-\sum_{u=0}^{x-1}\left(V_{p_u}(t_{k_u})-V_{q(u+1)}(t_{k_u})\right)-V_q(t_j)=N(t_i)-N(t_j) \tag{14}$$

Thus, it has been shown that the proposition M1 holds for the condition b.

Thus, it has been proved that when the scan matrix satisfies the condition a or the condition b, there always exists a matrix D(i, j) that extracts a difference between noise in the i-th measurement execution and noise in the j-th measurement execution, that is, $N(t_i)-N(t_j)$, from $V_{in}$.

Condition for $M_{decode}$

In the present invention, the matrix $M_{decode}$ with M*L rows and M*L columns of the detection circuit is generated so as to satisfy a following condition c.

Condition c

When the matrix $M_{decode}$ with M*L rows and M*L columns is decomposed into M*L row vectors (with a length of M*L) as shown in Equation (15) described below, if a (p+M*i)th row vector is denoted by H(p, i), then H(p, i) can be expressed using D(i, k) as in Equation (16) described below.

$$M_{decode}=\begin{pmatrix} H(1,1)\\ H(2,1)\\ H(3,1)\\ \vdots\\ H(M-1,L)\\ H(M,L)\end{pmatrix} \tag{15}$$

$$H(p,i)=\text{One }(p,i)-\frac{1}{L}\sum_{k=1}^{L(k\neq i)}D(i,k) \tag{16}$$

where One(p, i) refers to a row vector in which elements have a value of 1 only in a (p+M*i)th column and elements in the other columns have a value of 0.

Proposition M2

Let W(p, $t_i$) denote the true value (the ideal detection value) of the detection circuit p at time $t_i$ (where the true value is a value obtained when only a physical detection value is detected without noise). When $M_{decode}$ satisfies the condition c, each of elements of the corrected input $V'_{in}$ obtained by multiplying the input $V_{in}$ by $M_{decode}$ is given by the sum of the true value W(p, $t_i$) and the average value of noise taken over all L measurement executions as shown in Equation (17).

$$V'_{in}=M_{decode}V_{in}=\begin{pmatrix} H(1,1)\\ H(2,1)\\ H(3,1)\\ \vdots\\ H(M-1,L)\\ H(M,L)\end{pmatrix}V_{in}=\begin{pmatrix} W(1,t_1)+\frac{1}{L}\sum_{k=1}^{L}N(t_k)\\ W(2,t_1)+\frac{1}{L}\sum_{k=1}^{L}N(t_k)\\ W(3,t_1)+\frac{1}{L}\sum_{k=1}^{L}N(t_k)\\ \vdots\\ W(M-1,t_L)+\frac{1}{L}\sum_{k=1}^{L}N(t_k)\\ W(M,t_L)+\frac{1}{L}\sum_{k=1}^{L}N(t_k)\end{pmatrix} \tag{17}$$

Proof of Proposition M2

If it is proved that Equation (18) described below is true for any p and i, then the proposition M2 is also true, and thus, based on this, it is proved that when $M_{decode}$ satisfies the condition c, the following equation holds for arbitrary p and i.

$$H(p, i)V_{in} = W(p, t_i) + \frac{1}{L}\sum_{k=1}^{L} N(t_k) \tag{18}$$

When the condition c is satisfied, H(p, i) can be replaced by the sum of a One(p, i) vector and a D(i, k) vector, and thus Equation (19) described below holds.

$$H(p, i)V_{in} = One\ (p, i)V_{in} - \frac{1}{L}\sum_{k=1}^{L(k\neq i)} D(i, k)V_{in} \tag{19}$$

By definition of One(p, i) (a vector in which an element in (p+L*i)th column has a value of 1 and elements in the other columns have a value of 0), the product of One(p, i) and $V_{in}$ extracts only the (p+L*i)th element, and thus Equation (20) shown below is obtained.

$$\mathrm{One}(p,i)V_{in} = W(p,i) + N(t_i) \tag{20}$$

By Equation (21) defining D(i, k), Equation (22) shown below is obtained.

$$D(i, k)V_{in} = N(t_i) - N(t_k) \tag{21}$$

$$\sum_{k=1}^{L(k\neq i)} D(i, k)V_{in} = \sum_{k=1}^{L(k\neq i)} \{N(t_i) - N(t_k)\} = (L-1)N(t_i) = \sum_{k=1}^{L(k\neq i)} N(t_k) \tag{22}$$

Thus, Equation (23) shown below obtained.

$$H(p, i)V_{in} = W(p, i) + N(t_i) - \frac{1}{L}\left\{(L-1)N(t_i) - \sum_{k=1}^{L(k\neq i)} N(t_k)\right\} \tag{23}$$

Summing $N(t_i)$ yields Equations (24) and (25) as shown below.

$$H(p, i)V_{in} = W(p, i) + \frac{1}{L}N(t_i) + \frac{1}{L}\sum_{k=1}^{L(k\neq i)} N(t_k) \tag{24}$$

$$H(p, i)V_{in} = W(p, i) + \frac{1}{L}\sum_{k=1}^{L} N(t_k) \tag{25}$$

Since Equation to be proved has been obtained by rewriting as described above, the proposition M2 holds. Therefore, when $M_{decode}$ satisfies the condition c, it is proved that in the corrected input $V_{in}$ obtained by multiplying the input $V_{in}$ by $M_{decode}$, the true value of the input yin remains without changing and only noise is corrected (to the average value taken over all L measurements).

The proofs of the proposition M1 and the proposition M2 indicate that if the scan matrix $Z_i$ that satisfies the condition a or b and the correction matrix $M_{decode}$ that satisfies the condition c are prepared, it is possible to obtain the corrected input $V_{in}$ corrected such that only the noise components of the input $V_{in}$ are corrected to the same value (the average value of all noise components).

Next, a specific example of $M_{decode}$ will be described. When L=2 as in the present embodiment, it is necessary to satisfy the condition a for $i=t_0$ and $j=t_1$. More specifically, the condition a to be satisfied is that there exist p and q such that the p-th row components of $Z_{t0}$ and the q-th row components of $Z_{t1}$ are equal to each other ($0\leq p, q<2$). When one detection circuit (for example, $p_1$) detects the same sensor $S_2$ at any time, then the $p_1$ components (the first row) of $Z_{t0}$ and the $p_1$ component (the first row) of $Z_{t1}$ are equal, and thus condition a is satisfied.

In such a case, $V_{p1}(t_0)$, which is the detection value of the detection circuit $p_1$ at time $t_0$, and $V_{p1}(t_1)$, which is the detection value of the detection circuit $p_1$ at time $t_1$, are equal to each other except for noise. Therefore, $D(t_0, t_1)$ can be obtained by subtracting $V_{p1}(t_1)$ from $V_{p1}(t_0)$ as shown in following Equation (26). Note that $D(t_1, t_0)=-D(t_0, t_1)$.

$$D(t_0,t_1)=V_{p1}(t_0)-V_{p1}(t_1)=N(t_0)-N(t_1)$$

$$D(t_1,t_0)=V_{p1}(t_1)-V_{p1}(t_0)=N(t_1)-N(t_0) \tag{26}$$

Here, the value $V_{p0}(t_0)$ detected at time $t_0$ has a noise component $N(t_0)$ as with $V_{p0}(t_0)=V_{S0}+N(t_0)$. However, only the noise component $N(t_0)$ can be replaced by the average value of the two components $((N(t_0)+N(t_1))/2)$ by adding following Equation (27) to $V_{p0}(t_0)$.

$$\frac{D(t_1, t_0)}{2} = \frac{V_{p1}(t_1) - V_{p1}(t_0)}{2} = \frac{N(t_1) - N(t_0)}{2} \tag{27}$$

As a result of adding, Equation (28) is obtained as shown below.

$$V_{p0}(t_0) + \frac{V_{p1}(t_1) - V_{p1}(t_0)}{2} = \begin{pmatrix}1 & -\frac{1}{2} & 0 & \frac{1}{2}\end{pmatrix}\begin{pmatrix}V_{p0}(t_0)\\ V_{p1}(t_0)\\ V_{p0}(t_1)\\ V_{p1}(t_1)\end{pmatrix} \tag{28}$$

That is, as shown in Equation (29), by using a row vector $T_{p0,t0}$, $V'_{p0}(t_0)$ is obtained as a result of replacing only the noise component of $V_{p0}(t_0)$.

$$V'_{p0}(t_0) = T_{p0,t0} \cdot V_{in} = \begin{pmatrix}1 & -\frac{1}{2} & 0 & \frac{1}{2}\end{pmatrix}\cdot\begin{pmatrix}V_{p0}(t_0)\\ V_{p1}(t_0)\\ V_{p0}(t_1)\\ V_{p1}(t_1)\end{pmatrix} = V_{s0} + \frac{N(t_0) + N(t_1)}{2} \tag{29}$$

By performing similar processing for $V_{p1}(t_0)$, $V_{p0}(t_1)$, and $V_{p1}(t_1)$ and then arranging resultant row vectors $T_{p,t}$ in different corresponding rows, 4×4 $M_{decode}$ can be obtained. The above explanation is for the case where the detection circuits $p_0$ and $p_1$ are used. In a case where the detection circuits $p_1$ and $p_2$ according to the present embodiment are used, $M_{decode}$ can be derived in a similar manner as shown in Equation (5), and the calculation is performed according to Equation (6).

Figure 5:
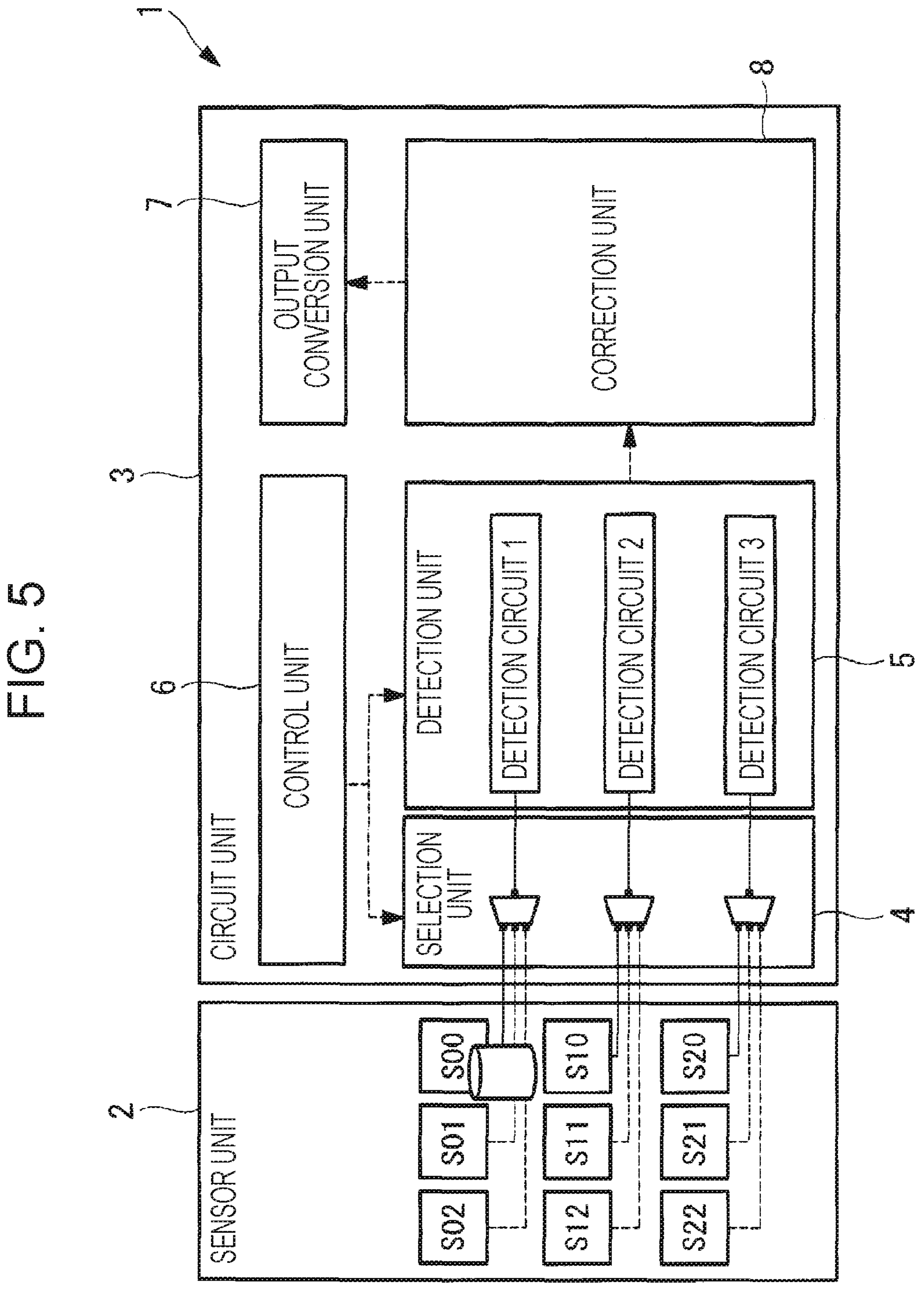
FIG. 5 is a diagram illustrating another example of a system configuration of the measurement device according to the first embodiment of the present disclosure.

The present embodiment has been described above for the case where N=3, M=2, and L=2, by way of example but not limitation. However, it is preferable to set N<M×L. For example, in a case where N=9, M=3, and L=4 as shown in FIG. 5, processing may be performed in a similar manner to equalize the offset by employing the average value of four time-dependent noise components.

As described above, in the measurement device, the measurement method, and measurement program therefor according to the present embodiment, even in the case where the detection values include time-dependent noise components, the noise components of the detection values can be equalized by correcting each detection value using the detection value obtained in each measurement such that the time-dependent noise component included in each detection value is given by a common noise component (the average value) obtained by statistically processing a plurality of detection values obtained at different measurement times. Therefore, it is possible to suppress variations in the influence of noise components on the true values, and thus it is possible to improve the measurement accuracy.

Since the common noise component is given by the average value, the influence of the time-dependent noise components can be effectively reduced even when the variation in the values of the time-dependent noise components is large. For example, in a case where the time-dependent noise is equalized to a reference value given by time-dependent noise included in a measurement value at a certain measurement time, if the time-dependent noise used as the reference value is large, there is a possibility that the true value is buried in the equalized noise. However, when the common noise component is given by the average value of the noise components, it is possible to suppress the possibility that the true value is buried in noise.

In measurement executions, the combination of sensors is selected so as to be different from a combination used in a previous measurement, and thus the measurement can be performed efficiently while changing the combination from one measurement to next. By setting the combination for each measurement in advance, it becomes possible to perform the conversion using an appropriate transformation matrix.

The measurement is performed at predetermined time intervals or at predetermined timings, and thus each measurement can be performed properly. For example, by reducing the time interval, it becomes possible to suppress changes in the true values and thus improve the measurement accuracy.

By calculating the detection result corresponding to each sensor using the corrected detection value, it is possible to obtain the detection result corresponding to each sensor.

By using the capacitance sensors, it is possible to suppress the noise component, and thus it is possible to grasp the position of the measurement target such as a finger more accurately.

Second Embodiment

Next, a measurement device, a measurement method therefor, and a measurement program therefor according to a second embodiment of the present disclosure are described.

The second embodiment is described for a case where the offset noise equalized by the output conversion unit 7 is cancelled. In the following description of the measurement device, the measurement method, and the measurement program therefor according to the present embodiment, the description of points similar to those in the first embodiment is omitted, and the description will focus on different points.

Figure 6:
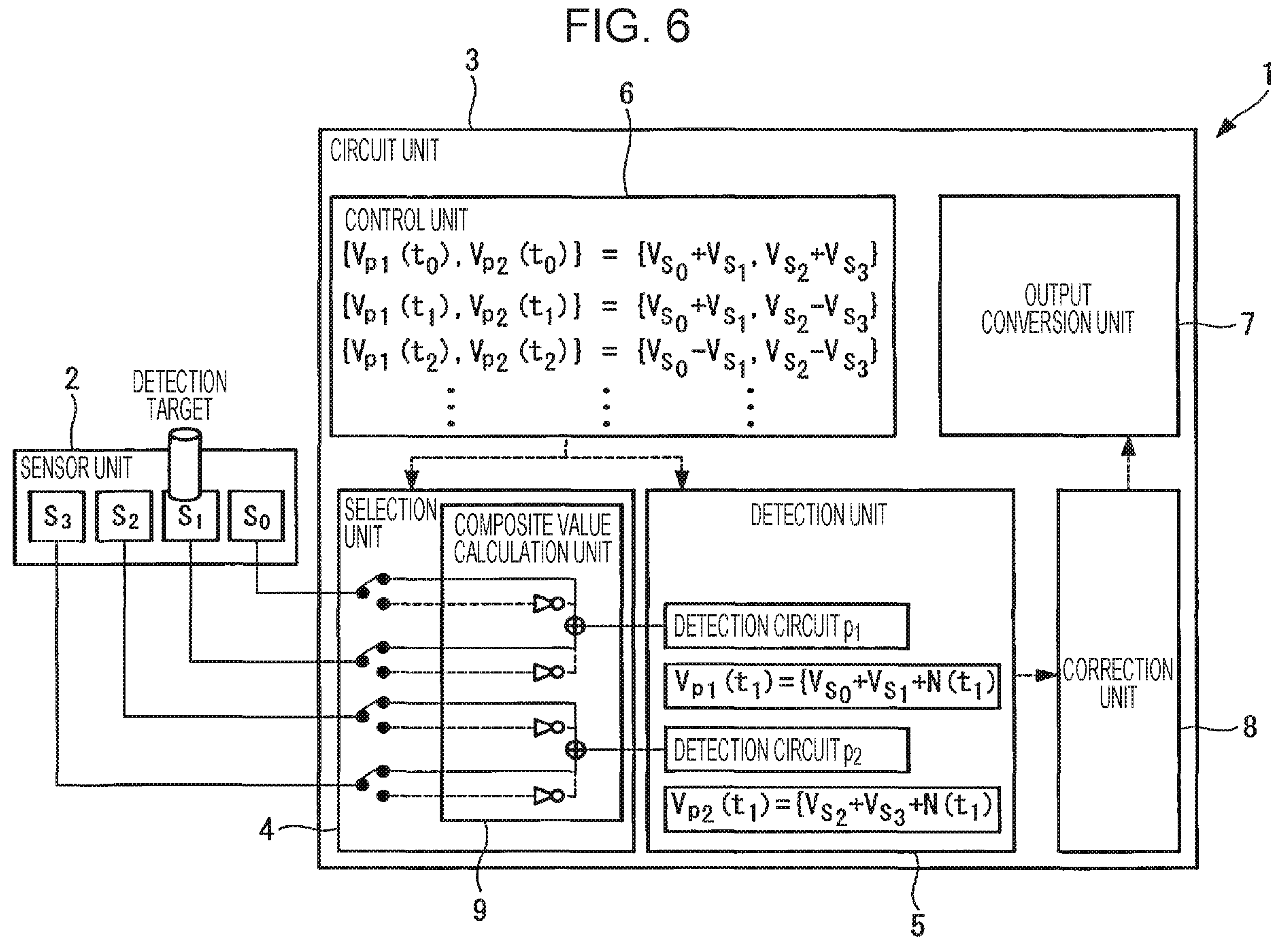
FIG. 6 is a diagram illustrating a system configuration of a measurement device according to a second embodiment of the present disclosure.

FIG. 6 is a diagram illustrating a system configuration of the measurement device 1 according to the present embodiment. In the present embodiment, the measurement device 1 includes a total of four sensors including sensors $S_0$ to $S_3$, and the selector 4 further includes a composite value calculation unit 9. The selection unit 4 (the composite value calculation unit 9) calculates a composite output value based on measurement values provided by the selected sensors, and outputs the resultant composite output value as a detection value. The composite value calculation unit 9 includes, for example, an inverting amplifier circuit and an addition circuit. The composite value calculation unit 9 may include an amplifier circuit with an amplification gain other than 1. The selection unit 4 controls the connection state using switches, and the composite value calculation unit 9 makes an addition and/or subtraction of detection values detected by selected sensors thereby generating a composite output value. In the case where the composite output value is calculated in the above-described manner, the correction unit 8 corrects each composite output value (the detection value).

Thereafter, the output conversion unit 7 according to the present embodiment cancels the common noise component equally included in each of the corrected M×L detection values, and outputs the detection results corresponding to the respective N sensors. That is, the output conversion unit 7 cancels the offset noise (the common noise component) equally included in each detection value (each composite output value) after the correction, and, using each resultant detection value obtained after cancelling the offset noise, the output conversion unit 7 outputs a detection result corresponding to each of the sensors. For example, let it be assumed that the measurement is executed 5 times such that one measurement is executed at each of times $t_0$ to $t_5$. When the composite output values are denoted by $W_0$ to $W_5$, the column vector indicating each composite output value obtained via five measurement executions is represented by Equation (30) shown below.

$$V_{in} = \begin{pmatrix} V_{p1}(t_0) \\ V_{p2}(t_0) \\ V_{p1}(t_1) \\ V_{p2}(t_1) \\ V_{p1}(t_2) \\ V_{p2}(t_2) \\ V_{p1}(t_3) \\ V_{p2}(t_3) \\ V_{p1}(t_4) \\ V_{p2}(t_4) \end{pmatrix} = \begin{pmatrix} W_0 + N(t_0) \\ W_1 + N(t_0) \\ W_0 + N(t_1) \\ W_3 + N(t_1) \\ W_2 + N(t_2) \\ W_3 + N(t_2) \\ W_2 + N(t_3) \\ W_5 + N(t_3) \\ W_4 + N(t_4) \\ W_5 + N(t_4) \end{pmatrix} \tag{30}$$

For the column vector represented by Equation (30), the noise can be equalized in a similar manner to Equation (6) as shown in Equation (31).

$$\begin{pmatrix} W_0' \\ W_1' \\ W_2' \\ W_3' \\ W_4' \\ W_5' \end{pmatrix} = \begin{pmatrix} 0.2 & 0.0 & 0.8 & -0.6 & -0.4 & 0.6 & 0.4 & -0.2 & 0.0 & 0.2 \\ -0.8 & 1.0 & 0.8 & -0.6 & -0.4 & 0.6 & 0.4 & -0.2 & 0.0 & 0.2 \\ 0.2 & 0.0 & -0.2 & 0.4 & 0.6 & -0.4 & 0.4 & -0.2 & 0.0 & 0.2 \\ 0.2 & 0.0 & -0.2 & 0.4 & -0.4 & 0.6 & 0.4 & -0.2 & 0.0 & 0.2 \\ 0.2 & 0.0 & -0.2 & 0.4 & 0.6 & -0.4 & -0.6 & 0.8 & 1.0 & -0.8 \\ 0.2 & 0.0 & -0.2 & 0.4 & 0.6 & -0.4 & -0.6 & 0.8 & 0.0 & 0.2 \end{pmatrix} \tag{3.1}$$

-continued $$\begin{pmatrix} W_0+N(t_0) \\ W_1+N(t_0) \\ W_0+N(t_1) \\ W_3+N(t_1) \\ W_2+N(t_2) \\ W_3+N(t_2) \\ W_2+N(t_3) \\ W_5+N(t_3) \\ W_4+N(t_4) \\ W_5+N(t_4) \end{pmatrix} = \begin{pmatrix} W_0+\frac{N(t_0)+N(t_1)+N(t_2)+N(t_3)+N(t_4)}{5} \\ W_1+\frac{N(t_0)+N(t_1)+N(t_2)+N(t_3)+N(t_4)}{5} \\ W_2+\frac{N(t_0)+N(t_1)+N(t_2)+N(t_3)+N(t_4)}{5} \\ W_3+\frac{N(t_0)+N(t_1)+N(t_2)+N(t_3)+N(t_4)}{5} \\ W_4+\frac{N(t_0)+N(t_1)+N(t_2)+N(t_3)+N(t_4)}{5} \\ W_5+\frac{N(t_0)+N(t_1)+N(t_2)+N(t_3)+N(t_4)}{5} \end{pmatrix}$$

As described above, also for the composite output values, the noise components are equalized among the composite output values to the average value. However, at this stage, each composite output value is given by combining detection values of sensors, and it does not represent the detection result corresponding to each sensor. Therefore, the conversion is performed by the output conversion unit 7. For example, let composite output values be defined using detection values of sensors as shown in Equation (32). In the composite output values by Equation (32), values obtained by adding values of two sensors ($W_0=V_{S0}+V_{S1}$, $W_1=V_{S2}+V_{S3}$) are prepared as reference values, and combinations obtained by subtracting one value from the other one of two values ($W_2=V_{S0}-V_{S1}$, $W_3=V_{S2}-V_{S3}$, $W_4=-V_{S0}+V_{S1}$, $W_5=-V_{S2}+V_{S3}$) are prepared.

$$\begin{pmatrix} W_0 \\ W_1 \\ W_2 \\ W_3 \\ W_4 \\ W_5 \end{pmatrix} = \begin{pmatrix} V_{S0}+V_{S1} \\ V_{S2}+V_{S3} \\ V_{S0}-V_{S1} \\ V_{S2}-V_{S3} \\ -V_{S0}+V_{S1} \\ -V_{S2}+V_{S3} \end{pmatrix} = \begin{pmatrix} 1 & 1 & 0 & 0 \\ 0 & 0 & 1 & 1 \\ 1 & -1 & 0 & 0 \\ 0 & 0 & 1 & -1 \\ -1 & 1 & 0 & 0 \\ 0 & 0 & -1 & 1 \end{pmatrix} \begin{pmatrix} V_{S0} \\ V_{S1} \\ V_{S2} \\ V_{S3} \end{pmatrix} \tag{32}$$

According to Equation (32), it is possible to derive $M_{out}$ (restoration matrix) for restoring the detection value of each sensor from the composite output values. Note that the restoration matrix $M_{out}$ is set such that the sum of the matrix elements in each row (the sum of column elements included in each row) is zero. More specifically, the restoration is performed using the restoration matrix as shown in Equation (33) described below.

$$\begin{pmatrix} V_{S0} \\ V_{S1} \\ V_{S2} \\ V_{S3} \end{pmatrix} = M_{out} \begin{pmatrix} W_0 \\ W_1 \\ W_2 \\ W_3 \\ W_4 \\ W_5 \end{pmatrix} = \tag{33}$$

$$\begin{pmatrix} 0.5 & 0 & 0 & 0 & -0.5 & 0 \\ 0.5 & 0 & -0.5 & 0 & 0 & 0 \\ 0 & 0.5 & 0 & 0 & 0 & -0.5 \\ 0 & 0.5 & 0 & -0.5 & 0 & 0 \end{pmatrix} \begin{pmatrix} W_0 \\ W_1 \\ W_2 \\ W_3 \\ W_4 \\ W_5 \end{pmatrix} = \begin{pmatrix} W_0-W_4 \\ W_0-W_2 \\ W_1-W_5 \\ W_1-W_3 \end{pmatrix} /2$$

That is, when each composite output value is prepared as in Equation (32), halving the result of subtraction of two composite output values yields a detection value of a certain sensor as shown in Equation (33).

Here, each composite output value includes an equalized noise component (an average value) as shown in Equation (31). Therefore, if Equation (33) is calculated using the equalized composite output values given by Equation (31), the equalized noise component is canceled when a certain composite output value is subtracted from another certain composite output value as shown in Equation (33). Therefore, each of $V_{S0}$ to $V_{S3}$ calculated according to Equation (33) is equal to the ideal true value of the detection value of a corresponding one of sensors. That is, the absolute value of offset noise becomes zero. That is, it can be said that the output conversion unit 7 uses the restoration matrix $M_{out}$ configured such that the sum of matrix elements in any row is zero.

The present embodiment is not limited to a combination with the first embodiment. More specifically, the output conversion unit 7 according to the present embodiment can be widely used in a case where each composite output value is corrected such that time-dependent noise components included in the respective composite output values are equalized (that is, in a case where the offset noise is made equal). In the case where the time-dependent noise components included in the respective composite output values are equalized, the output conversion unit 7 cancels time-dependent noise components equally included in the respective composite output values and, by using the respective composite output values obtained after the time-dependent noise is cancelled, can output detection results corresponding to the respective sensors.

As described above, in the measurement device, the measurement method, and measurement program therefor according to the present embodiment, in the case where the time-dependent noise components included in the respective composite output values are equalized, the time-dependent noise components equally included in the respective composite output values can be cancelled, and thus it is possible to effectively suppress the noise components and obtain the detection results (for example, true values) of the respective sensors. That is, it becomes possible to effectively improve the measurement accuracy.

By calculating a composite output value based on the detection values of the selected sensors and correcting each composite output value, it is also possible to obtain a composite detection value of detection values of a plurality of sensors. For example, this makes it possible to deal with complicated circuit configurations.

The present disclosure is not limited to the embodiments described above, and various modifications can be made without departing from the scope of the invention. It is also possible to combine different embodiments.

The above embodiment has been described for the case where the average value is employed as the common noise component. However, it is also possible to employ other statistical values (for example, the median value, etc.) as long as they are values obtained by statistically processing a plurality of detection values obtained in different measurement executions.

What is claimed is:

1. A measurement device comprising:

a plurality N (N≥2) of capacitive sensors configured to measure a capacitance change associated with an object, each of the plurality of capacitive sensors outputting a respective measurement value;

a selection circuitry configured to control, by using switches, connection states between the N capacitive sensors and a plurality M (M<N) of detection circuits in accordance with preset scan matrices so as to, in each measurement, select a predetermined combination of sensors from among the N capacitive sensors and output a plurality M of detection values to corresponding M output terminals, based on the measurement values provided by the selected sensors;

an acquisition circuitry comprising the M detection circuits and configured to acquire the M detection values from the M output terminals in each measurement in accordance with preset measurement intervals, each of the M detection values including a time-dependent noise component depending on a measurement time at which the measurement is performed;

a control circuitry configured to execute L measurements in succession at the preset measurement intervals such that the L measurements are completed before an assumed environmental change occurs; and a correction circuitry configured to, after the L measurements have been performed to acquire M×L detection values, apply a predetermined correction matrix to generate M×L corrected detection values in which the time-dependent noise component in each of the M×L detection values is replaced by a common noise component which is obtained by averaging the time-dependent noise components across the L measurements.

2. The measurement device according to claim 1, wherein the predetermined correction matrix has M×L rows and M×L columns such that each corrected detection value is expressed as a sum of a true value and the common noise component.

3. The measurement device according to claim 1, wherein the selection circuitry is further configured to calculate composite output values based on the measurement values provided by the selected sensors, thereby outputting the calculated composite values as the M detection values.

4. The measurement device according to claim 1, further comprising:

an output conversion circuitry configured to calculate a detection result for each of the N sensors based on the M×L corrected detection values output from the correction circuitry.

5. The measurement device according to claim 4, wherein the output conversion circuitry is configured to cancel the common noise component included in each of the M×L corrected detection values, thereby outputting resultant values as the detection results corresponding to the N sensors.

6. The measurement device according to claim 4, wherein the output conversion circuitry is configured to calculate the detection results by applying a restoration matrix having N rows and M×L columns to the M×L corrected detection values.

7. The measurement device according to claim 6, wherein the restoration matrix is configured such that a sum of all matrix elements in an arbitrary row is zero.

8. The measurement device according to claim 1, wherein each of the N sensors is a capacitive sensor.

9. A measurement method using a measurement device including a plurality N (N≥2) of capacitive sensors configured to measure a capacitance change associated with an object, the method comprising:

controlling, by using switches, connection states between the N capacitive sensors and a plurality M (M<N) of detection circuits in accordance with preset scan matrices so as to, in each measurement, select a predetermined combination of sensors from among the N capacitive sensors and output a plurality M of detection values to corresponding M output terminals, based on measurement values provided from the selected sensors;

acquiring, with the M detection circuits, the M detection values from the M output terminals in each measurement in accordance with preset measurement intervals, each of the M detection values includes a time-dependent noise component depending on a measurement time at which the measurement is performed;

executing L measurements in succession at the preset measurement intervals such that the L measurements are completed before an assumed environmental change occurs; and after the L measurements have been performed to acquire M×L detection values, applying a predetermined correction matrix to generate M×L corrected detection values in which the time-dependent noise component in each of the M×L detection values is replaced by a common noise component which is obtained by averaging the time-dependent noise components across the L measurements.

10. A non-transitory computer-readable storage device, tangibly embodying a measurement program for a measurement device including a plurality N (N≥2) of capacitive sensors configured to measure a capacitance change associated with an object, the storage device being configured to cause a computer to execute process steps, the process steps comprising:

controlling, by using switches, connection states between the N capacitive sensors and a plurality M (M<N) of detection circuits in accordance with preset scan matrices so as to, in each measurement, select a predetermined combination of sensors from among the N capacitive sensors and output a plurality M of detection values to corresponding M output terminals, based on measurement values provided from the selected sensors;

acquiring, with the M detection circuits, the M detection values from the M output terminals in each measurement in accordance with preset measurement intervals, each of the M detection values includes a time-dependent noise component depending on a measurement time at which the measurement is performed;

executing L measurements in succession at the preset measurement intervals such that the L measurements are completed before an assumed environmental change occurs; and after the L measurements have been performed to acquire M×L detection values, applying a predetermined correction matrix to generate M×L corrected detection values in which the time-dependent noise component in each of the M×L detection values is replaced by a common noise component which is obtained by averaging the time-dependent noise components across the L measurements.

11. The measurement method according to claim 9, wherein the applying includes:

correcting each of the M×L detection values using the correction matrix having M×L rows and M×L columns such that each corrected detection value is expressed as a sum of a true value and the common noise component.

12. The measurement method according to claim 9, wherein the controlling includes:

calculating composite output values based on the measurement values provided by the selected sensors, thereby outputting the calculated composite values as the M detection values.

13. The measurement method according to claim 9, further comprising:

calculating a detection result for each of the N sensors based on the M×L corrected detection values.

14. The measurement method according to claim 13, wherein the calculating a detection result includes:

canceling the common noise component included in each of the M×L corrected detection values, thereby outputting resultant values as the detection results corresponding to the N sensors.

15. The measurement method according to claim 13, wherein the calculating the detection result includes:

applying a restoration matrix having N rows and M×L columns to the M×L corrected detection values.

16. The measurement method according to claim 15, wherein the restoration matrix is configured such that a sum of all matrix elements in an arbitrary row is zero.

* * * * *